United States Patent
Harrison et al.

(10) Patent No.: US 7,626,763 B2
(45) Date of Patent: Dec. 1, 2009

(54) FLEXIBLE LASER SAFETY CURTAIN

(75) Inventors: Michael Harrison, Chillicothe, OH (US); Joseph D. Ferrario, Ann Arbor, MI (US); Ashot Mesropyan, Circleville, OH (US)

(73) Assignee: Telesis Technologies, Inc., Circleville, OH (US)

( * ) Notice: Subject to any disclaimer, the term of this patent is extended or adjusted under 35 U.S.C. 154(b) by 0 days.

(21) Appl. No.: 11/796,556

(22) Filed: Apr. 27, 2007

(65) Prior Publication Data

US 2007/0258502 A1 Nov. 8, 2007

Related U.S. Application Data

(60) Provisional application No. 60/797,258, filed on May 2, 2006.

(51) Int. Cl.
- G02B 27/22 (2006.01)
- E06B 3/48 (2006.01)
- E06B 7/086 (2006.01)
- G21F 5/00 (2006.01)
- G21F 1/00 (2006.01)
- G21F 3/00 (2006.01)
- G21C 11/00 (2006.01)

(52) U.S. Cl. .................. 359/477; 160/229.1; 250/515.1; 250/519.1

(58) Field of Classification Search .................. 160/135, 160/40, 229.1; 250/515.1, 516.1, 517.1; 359/719, 477
See application file for complete search history.

(56) References Cited

U.S. PATENT DOCUMENTS

| | | | | |
|---|---|---|---|---|
| 4,187,130 A | * | 2/1980 | Kautz | 156/42 |
| 6,571,852 B2 | * | 6/2003 | Toepel | 160/135 |

\* cited by examiner

*Primary Examiner*—Ricky L Mack
*Assistant Examiner*—Brandi N Thomas
(74) *Attorney, Agent, or Firm*—David H. Jaffer; Pillsbury Winthrop Shaw Pittman LLP (57) ABSTRACT

A flexible laser safety curtain is disclosed that utilizes a plurality of columns flexibly attached to one another along their longitudinal edges in such a manner as to create a curtain of columns. The base of each column contains a cavity within which at least one moveable element, columnar in form, may be located and protrude from the cavity. The moveable element, when pressed against a work surface, is forced into the cavity. A biasing element within the cavity provides an opposite force on the moveable elements to both keep the moveable element in contact with the work surface, and to return the moveable element to its original position when the inward force is removed. The curtain's edge follows the contours of an uneven work surface and thereby the curtain provides a complete barrier to laser radiation.

5 Claims, 9 Drawing Sheets

FLEXIBLE LASER SAFETY CURTAIN

RELATED APPLICATIONS

The present application claims priority from U.S. Provisional Patent application Ser. No. 60/797,258 filed May 2, 2006, which is incorporated herein by reference.

BACKGROUND OF THE INVENTION

1. Field of the Invention

The present invention relates generally to safety systems for lasers, and more particularly to a flexible laser safety shield that provides a flexibly adjustable barrier to laser radiation.

2. Brief Description of the Prior Art

Many types of laser-based devices and systems, having a wide range of applications in fields such as manufacturing, research, communications and medicine have become increasingly well-known and commercially available. The lasers used in many of these devices and systems are often capable of producing energy output that is potentially harmful to both people and equipment.

The potential dangers associated with lasers are several. For example, burns to the skin and clothing or even to nearby equipment, walls or other objects may be sustained if exposed to laser radiation of sufficient energy and for sufficient duration. Further, some forms of laser radiation can damage an unprotected human eye even before it has time to react to the exposure. This may lead to considerable physical damage to the eye, such as cutting or burning, and can also result in temporary or permanent vision impairment or blindness. The degree of danger depends on the energy, wavelength and focus of the laser radiation. For some parameters, the degree of danger may be minimal unless the object comes within a few inches of the laser source. At other focal lengths however, the laser radiation may be harmful even at large distances from the source.

Another potential danger associated with lasers is that of chemical vapors, dust or melted liquids that may be formed in the area where the laser interacts with a work surface, such as in laser welding or scribing. The harmful properties of those chemicals may adversely affect nearby persons if inhaled or otherwise transferred to the body.

Because of the potential dangers associated with lasers, a variety of safety devices have been devised to promote safe operation of laser-based equipment. Common forms of safety equipment include items such as safety goggles, workstation enclosures and warning labels, as well as more complex mechanical interlocks and shutter systems designed to disable the laser when safety sensors are triggered. Other systems have been designed to detect and disable rogue laser beams that are reflected, scattered, aimed or otherwise impinge on the walls of a room or enclosure containing the laser equipment. One such system includes infrared monitoring of walls and ceiling to detect heating of the surfaces by stray laser energy. Another system utilizes fluid-filled walls to detect when stray laser energy melts through an enclosure wall allowing the fluid to escape.

Standards have been established to require at least a minimum level of knowledge regarding the safe operation of a laser system to be passed on to a purchaser of such a system. Examples of such standards are those required by the U.S. Department of Health and Human Services Center for Devices and Radiological Health. These standards classify laser products on the basis of the highest level of laser radiation to which a human may be exposed during operation. Under this system, class ratings of I through IV are assigned to indicate the risk involved. A Class I system is the least risk, and generally involves emissions in the ultraviolet, visible and infrared spectra that are at levels below established biological hazard levels. Class II systems are considered a hazard for direct long-term ocular exposure. Class III system emission levels are ocular hazards for direct exposure and may be hazardous to skin at longer exposure times. Class IV systems are the most hazardous and pose a danger to eyes and skin upon direct, as well as indirect exposure, such as that resulting from scattered, diffused or reflected radiation.

Ideally, all laser based systems would be operated under a Class I rating in a manner providing the greatest safety to operators and bystanders as well as to nearby equipment and the facility which houses the laser. However, for reasons such as costs and performance requirements, laser systems are often operated at more dangerous classification levels. For example, providing a sealed enclosure for a laser system inside which the laser operation takes place may represent the safest scenario, but may be impractical due to cost and size where the laser system and work piece are large. Further, portable laser systems, by their very nature, may not function optimally with the safety systems available in the art. One example of this is where a portable laser is used to repair welds on a large, complex structure such as a building. Due to the size of the structure, an enveloping enclosure may not be practical.

Another problem in a laser system is the difficulty in determining the direction in which invisible laser radiation is aimed and what it is striking. Current positioning systems used to direct the laser beam may use gantry systems that move in an X-Y plane, galvanometers and robotic arms to steer the beam. Difficulties may be encountered with these systems in determining if the beam is always aimed at, and focused on, the desired target. If a laser beam is not aimed properly, it may be reflected or scattered off of the target and strike somewhere else potentially causing damage. Further, if the desired target is misaligned, has a hole in it or is missing altogether, damage to equipment and/or personnel can occur.

SUMMARY OF THE PRESENT INVENTION

An object of the present invention is to provide a method and apparatus for confining laser radiation to a determined area.

A further object of the present invention is to provide a shield for blocking laser radiation, wherein the shield has an edge portion configured to flexibly conform to an irregular mating surface.

A still further object of the present invention is to provide a shield for blocking laser radiation, wherein the shield has walls that are configured to conform to an irregular mating surface.

Another object of the present invention is to provide a shield for blocking laser radiation, wherein shield walls include a plurality of longitudinal members flexibly joined to provide lateral positioning, and wherein each of the members has a flexible edge portion for longitudinally conforming to a selected mating surface.

Briefly, a preferred embodiment of the present invention includes a shield configured to block laser radiation. The shield includes a wall portion configured to allow a user to place the shield in conformance around an irregularly shaped object. An edge portion of the shield is configured to be flexible for conforming with an irregularity of a mating surface upon which the curtain is placed. In a particular embodiment, the wall portion includes a plurality of cylindrical wall elements, joined together with flexible connection portions along longitudinal edges of the elements. The edge portion includes a plurality of moveable elements for conforming to an irregular mating surface, each element attached to a corresponding end of a cylindrical wall element.

DETAILED DESCRIPTION OF THE INVENTION

Figure 1A:
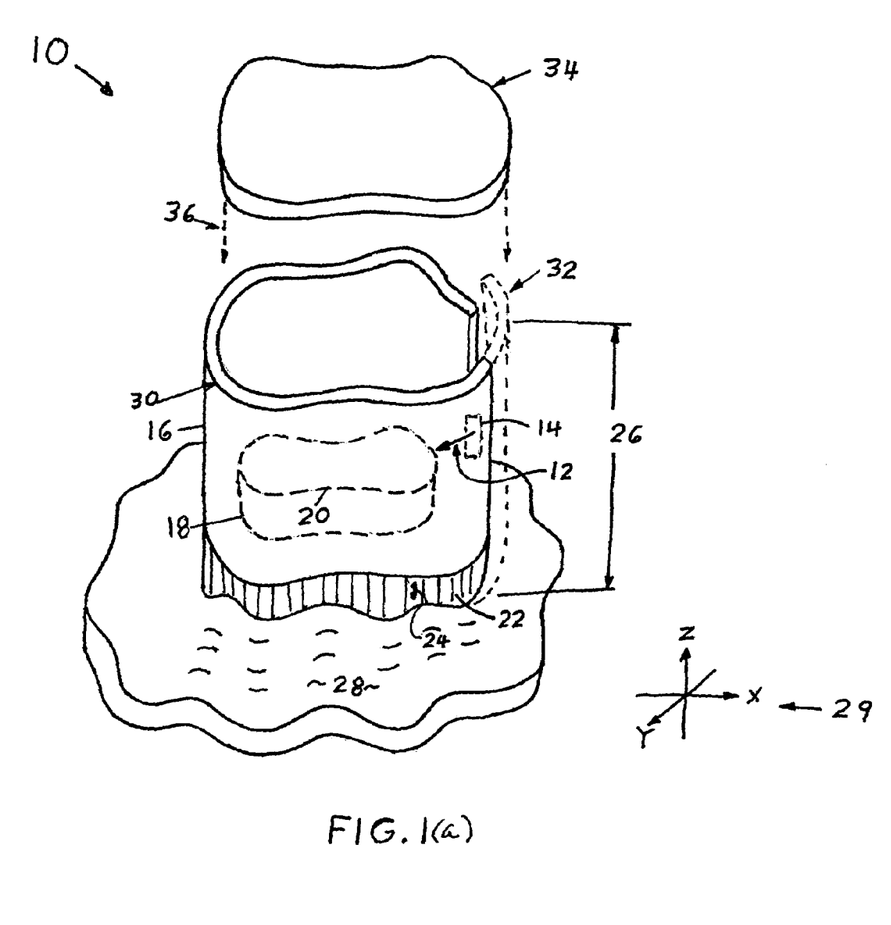
FIG. 1(a) is a perspective view illustrating general principles of the present invention.

An embodiment of the present invention is illustrated generally in FIG. 1(a). A flexible shield 10 is shown for blocking laser radiation 12 from a laser source 14. The shield 10 is configured with a flexible wall portion 16 allowing the shield 10 to be positioned near an object 18 which may have an irregular contour (such as 20) upon which the laser beam 12 is to be applied. The shield 10 also has a flexible edge portion 22, providing resilience in a direction 24 parallel to the wall portion 16 length 26. The resilient flexibility of edge portion 22 is for conformance with an irregular surface such as surface 28 upon which the shield 10 is positioned. The surface 28 may or may not be a part of an object 18.

Figure 1B:
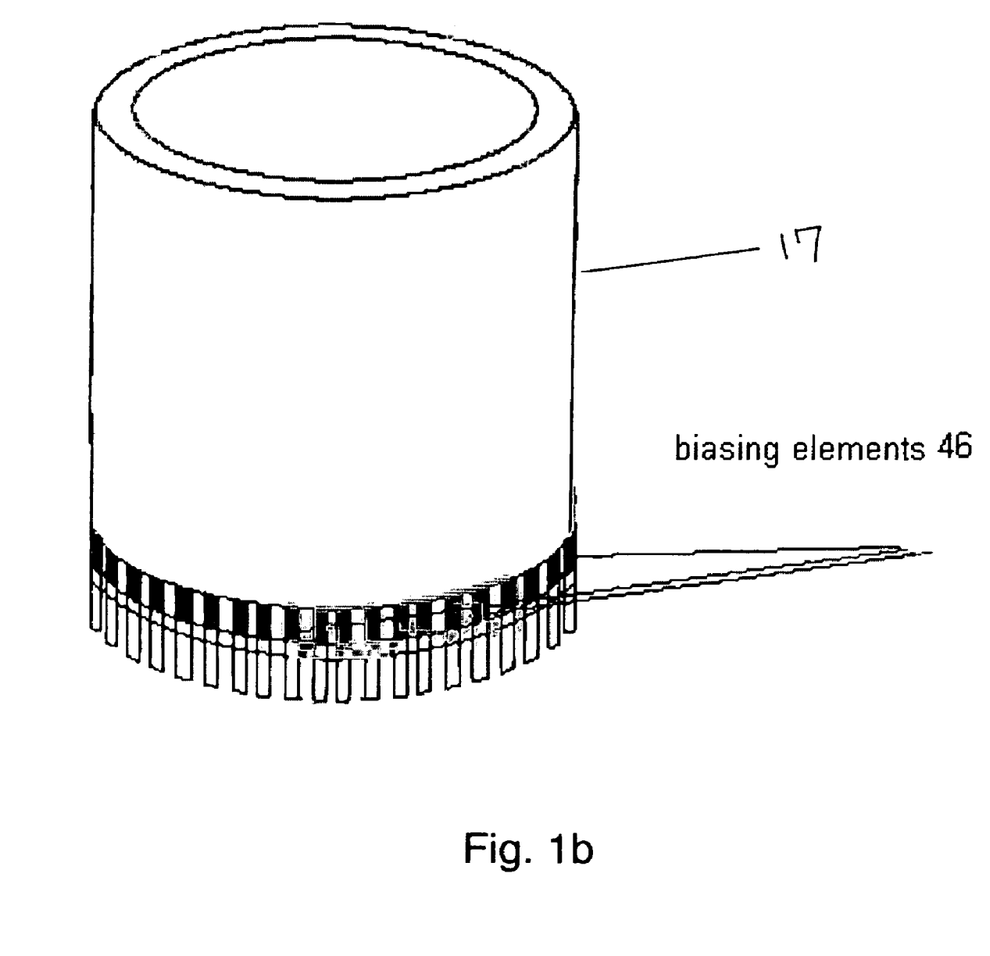
FIG. 1(b) is a perspective view of the present invention with a rigid wall having an edge portion configured to flexibly conform to an irregular mating surface.

For purposes of description of the flexibility of the shield, FIG. 1(a) shows an xyz coordinate system 29 for defining terminology to be used herein relating to shield orientation. Movement of the shield as shown in FIG. 1(a) in a z direction will be referred to as longitudinal. The direction 24 and height 26 are then described as longitudinal. Movement in the x-y plane will be referred to as lateral. With these definitions, the wall portion 16 is flexible in the lateral direction/plane, and the edge portion 22 is flexible and resilient in the longitudinal direction. In practice, the xyz coordinate system may have any orientation i.e. the term for example "longitudinal" may be in any direction, with "lateral" referred to in reference to the longitudinal direction. The wall portion in FIG. 1(a) does not need to be flexible. For example, in FIG. 1(b) the wall portion 17 serves a similar purpose as the wall portion 16 of FIG. 1(a), except that wall 17 is rigid instead of flexible. The rigid wall could have any shape (cylindrical, rectangular, etc.). The edge portion of this embodiment has an edge portion including biasing elements 46 that may be configured to flexibly conform to an irregular mating surface.

The edge portion 22 shown in FIG. 1(a) may be constructed of any material and/or configuration that will allow it to conform to an irregular surface upon being pressured against it. Various materials and configurations of an edge portion for resiliently conforming to an irregular surface will be apparent to those skilled in the art upon reading the present disclosure, and these are to be included in the present invention. Similarly, wall portion 16 can be constructed of any of various materials and designs that will allow it to conform to a contour in a lateral direction such as the non-linear contour 30 shown.

The shield 10 can be configured and positioned to partially surround an object 18, or totally surround it as indicated by the additional portion shown with dashed lines 32. As a further alternative, the shield can enclose an object 18 more completely. This is symbolically illustrated by the lines 34 indicating the wall portion extending to enclose what is shown as a top portion of the shield 10, but which could be in any orientation depending on the orientation of the wall portion 16. The arrows 36 are simply to indicate that the additional wall portion 34 can be attached to or integral with the wall portion 16.

The materials of which the shield is constructed can be any of various selection which will be understood by those skilled in the art, with the requirement that the material be capable of blocking a laser beam. This blocking can be by reflection or absorption, or a combination of reflection and absorption. Examples include metals, laser opaque plastics, filters, etc.

Figure 2:
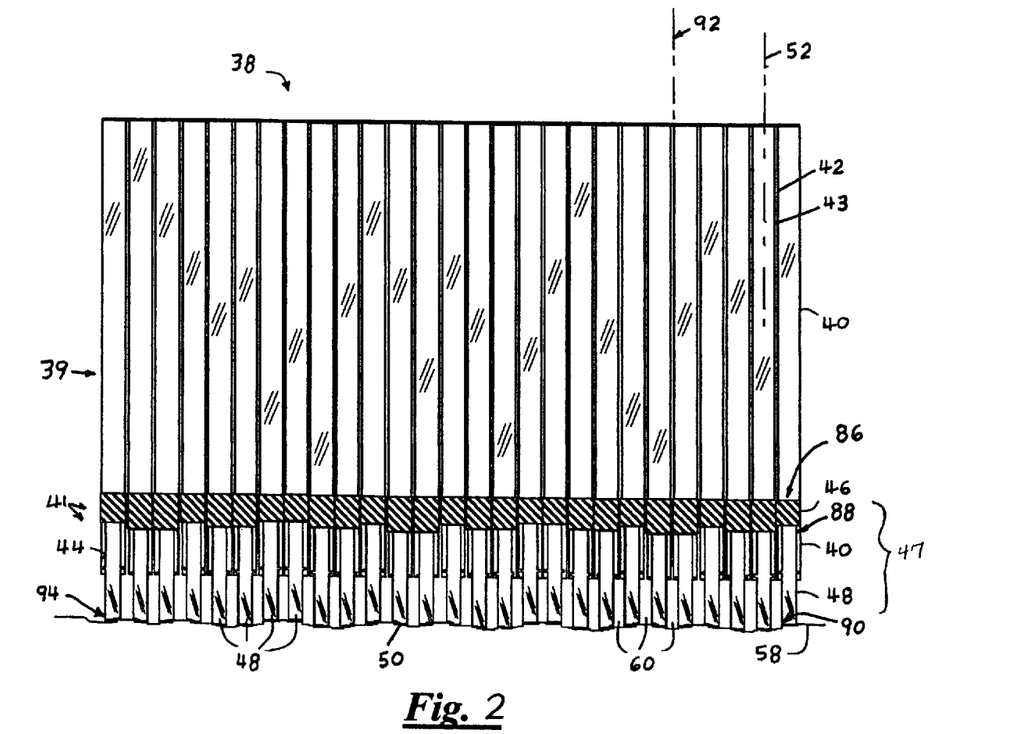
FIG. 2 is a side cross sectional view of a shield wall, showing the arrangement of components of a shield according to an embodiment of the present invention.

Particular constructions of a shield will now be described in detail in reference to the figures of the drawing. In FIG. 2 a shield 38 is in the form of a curtain. The shield 38 includes a wall portion 39 having a plurality of columns 40 flexibly joined together along their longitudinal edges 42 by linkage portions 43. The construction of the wall connecting linkage portions 43 can be simply a flexible material attached or integral with the interconnected columns 40. Other designs, such as hinges, etc. will be apparent to those skilled in the art and are included in the spirit of the present invention. The shield 38 of FIG. 2 has a flexible edge portion 41 for conforming to irregularities in a mating surface 58. The flexible edge portion 41 of the embodiment of FIG. 2 includes a plurality of resilient structures 47, each structure secured to one of the columns 40. Each resilient structure 47 partially resides in a cavity 44 of a column 40, and includes a biasing element 46, a moveable element 48 and a flexible element 50. Columns 40 may have any desired cross-sectional shape, such cross-section taken transverse to a longer axis such as 52 of the column. Further, the columns 40 are typically, but not necessarily equal in length. The particular length is determined by the required application. In an alternative embodiment, the column can be constructed with an adjustable length, such as with a telescoping section. In addition, the columns 40 can be made of any suitable material that provides qualities desirable in the shield such as, but not limited to, laser radiation resistance, and light weight, etc.

Figure 3:
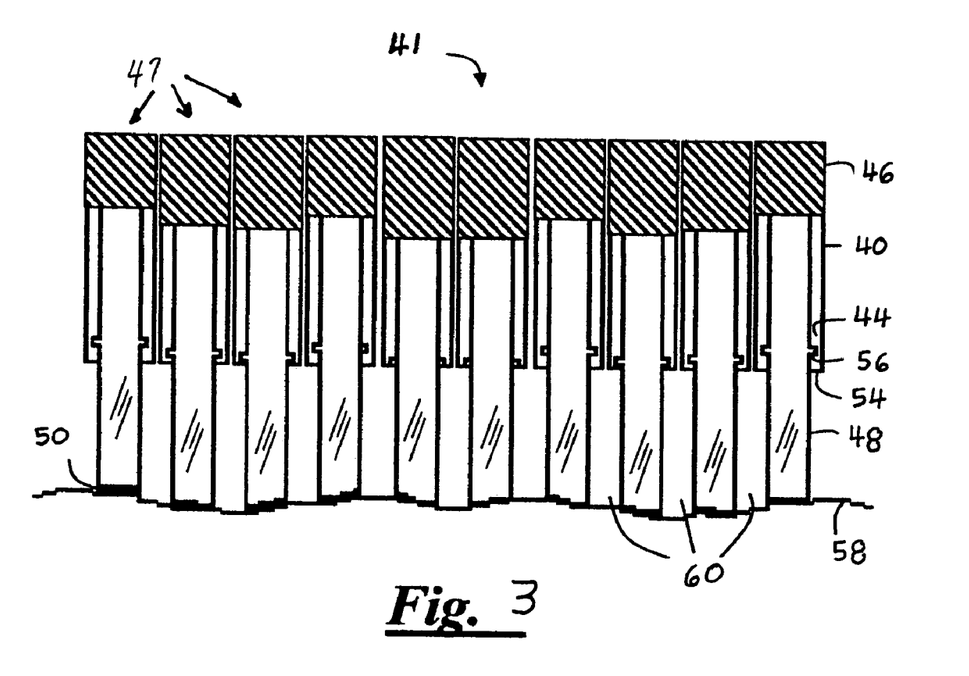
FIG. 3 is a cross sectional view of moveable elements in cavities of the shield of FIG. 2, for describing operation of the moveable elements as applied to an uneven work surface.
Figure 4:
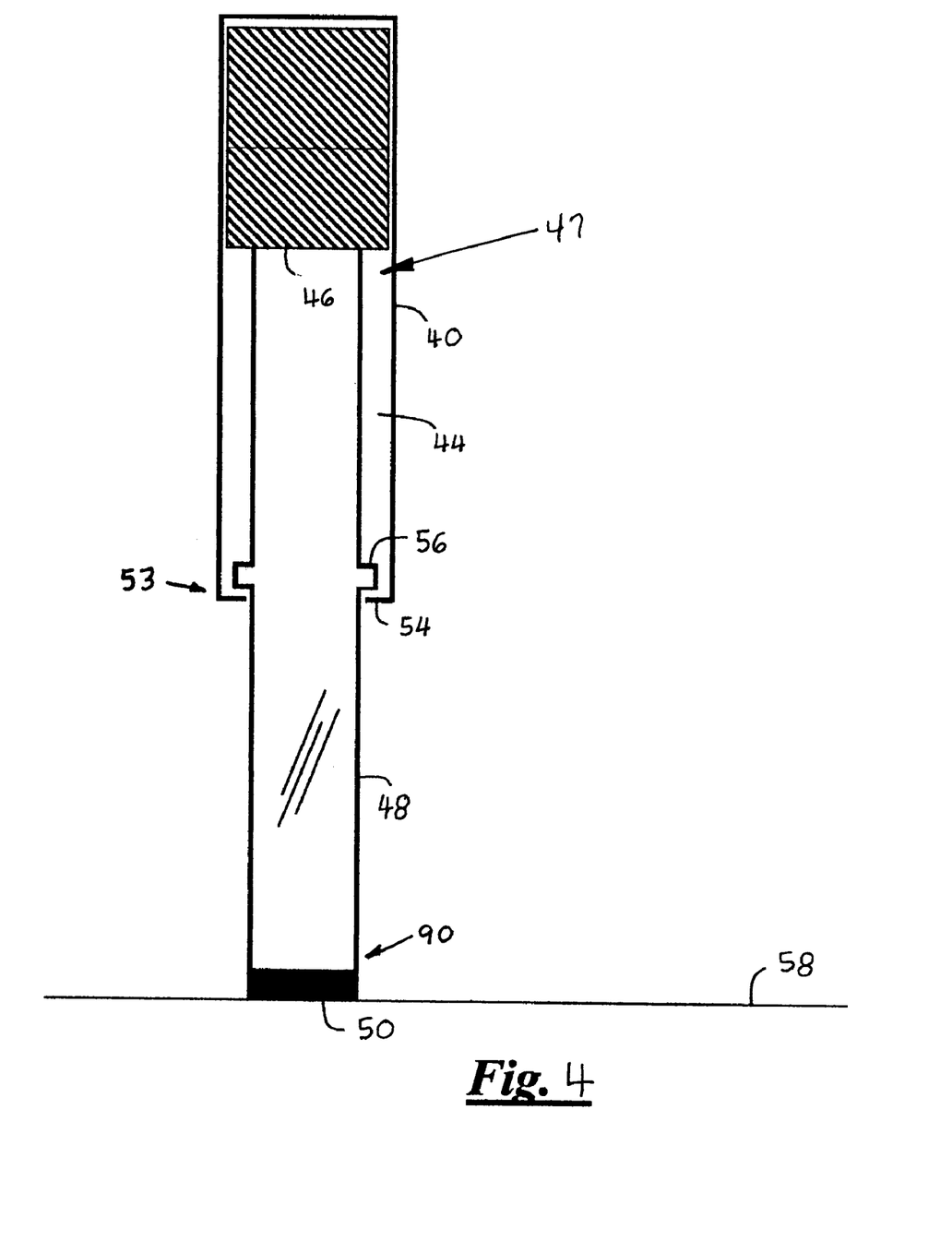
FIG. 4 is an enlarged cross sectional view of a moveable element in a cavity of a single column of the shield of FIG. 2.
Figure 5:
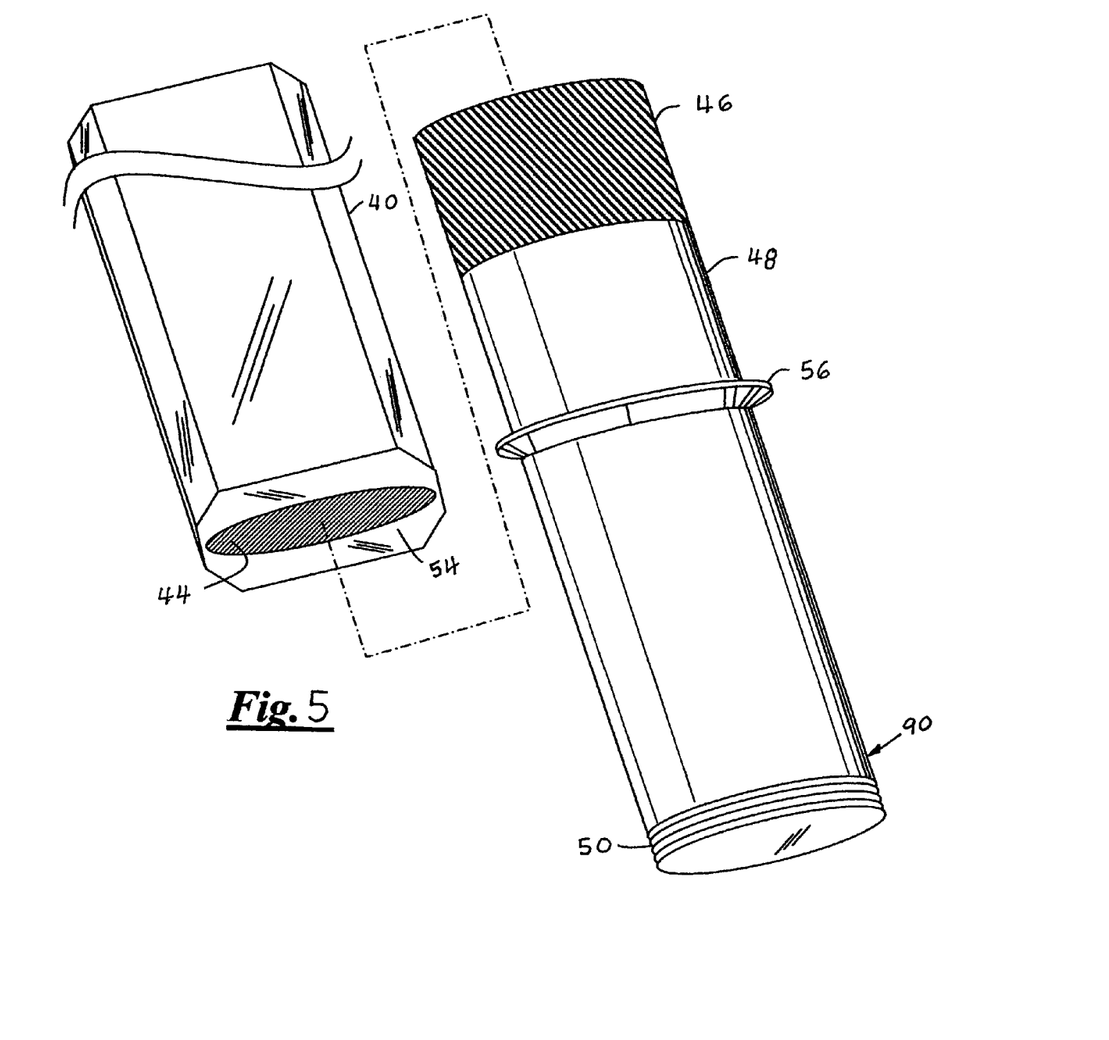
FIG. 5 is a perspective, exploded view of a column and moveable element of the shield of FIG. 2.

Details of the columns 40, and in particular the flexible edge portion 41 including biasing elements 46, moveable elements 48 and flexible elements 50 will now be described in further detail in reference to FIGS. 3 and 4, with continued reference to FIG. 2. The interior of each column 40 contains a cavity 44 along a first end 53. The size and shape of the cavity 44 in this embodiment are determined by the size and shape of the biasing elements 46 and moveable elements 48, as well as the desired travel distance of the moveable elements 48 and manufacturing considerations, etc. The cavity 44 may occupy only a portion of the column 40, including a portion necessary for insertion of the biasing element 46 and moveable element 48, or the entire column 40 or a smaller portion thereof may be hollow. In addition, cavity 44 may be partially enclosed by cavity tabs 54 extending inwardly from the interior surface of column 40 and into the cavity 44 as shown in FIGS. 3-5. Cavity tabs 54 may be any of various configurations such as tabs, lips, edges, ridges, or notches among others, hereinafter referred to as tabs. The function of the tabs 54 is to aid in preventing the moveable element 48 from falling out of the cavity 44 in a case wherein the biasing element 46 can not be relied on to be attached securely to the column 40 and to the moveable element 48. By providing interference with element tabs 56 protruding outward from the moveable element 48, the tabs 54 and 56 keep the moveable element from separating from the wall portion. Other alternative ways of retaining the moveable elements 48 will be apparent to those skilled in the art, and these are to be included in the spirit of the present invention.

The biasing element 46 provides a resilient resistance to travel of moveable element 48 longitudinally into and out of cavity 44 (FIGS. 2-5). The biasing element 46 is configured to provide an outward force on moveable element 48 when the moveably element is pressed inwardly to the cavity as a result of being pressed against a surface. The biasing element urges the moveable element in an outward direction from the cavity 44 so that when the shield 38 is pressed against an irregular surface such as surface 58 of FIG. 2, the elements conform to the irregularities as illustrated. Any suitable material or device may be employed to provide adequate resilient force and travel distance to the moveable element 48. For example, element 46 may be a spring, rubber bushing, foam insert, airbag, air (compressed by moveable element 48, so long as an effective air seal is provided in the vicinity of cavity tabs 54), or other appropriate apparatus that will be apparent to those skilled in the art.

Each moveable element 48 is configured in a columnar shape that moves into and out of a corresponding cavity 44 as depicted in FIGS. 2-5. Moveable elements 48 are for providing a barrier to laser radiation along the edge of shield 38, and conform that edge to a work surface 58 (FIGS. 2 and 3). The moveable elements 48 are restrained from separating from the wall portion 40 as explained above. In the embodiment illustrated, each moveable element 48 is retained partially within its corresponding cavity 44 by the inwardly projecting cavity tab 54, blocking movement of the outwardly projecting element tab 56. Element tabs 56 may be of any applicable configuration, such as a lip, edge, ridge, or notch, etc. Other methods and apparatus that serve the purpose of flexibly and resiliently attaching and retaining the moveable elements 48 to the wall portion 39 will be apparent to those skilled in the art upon reading the present disclosure, and these are also to be included in the spirit of the present invention. For example, flexible and resilient attachment could be achieved with one end of each biasing element 46 attached to a wall portion 39. Preferably each biasing element is attached to one of the columns 40, and an opposite end of the biasing element 46 attached to one end of the moveable element 48.

Moveable elements 48 can have any desirable transverse cross section including, but not limited to, shapes such as ovals (FIG. 5-7), circles, triangles or rectangles, etc. The embodiment shown in FIGS. 2-3 shows gaps 60 between each moveable element 48. The present invention also includes methods and apparatus for blocking laser radiation between these elements, and in any alternative embodiments that may have gaps such as gaps 60. For example, FIGS. 8a, 8b, 9 and 10 all show moveable elements that provide a laser block between separate moveable elements.

The present invention is suitable for dynamic use. For example, shield 38 in FIG. 2 can be moved across surface 58 in conjunction with movement of the laser source. During that motion, flexible edge portion 41 resiliently mates to surface 58. A similar result can be achieved if the workpiece having surface 58 is moved and shield 38 remains stationary, but movement of the shield and laser is preferable when the workpiece is large, and may be necessary where laser processing is occurring on the fly (while the laser and shield are moving).

Figure 8A:
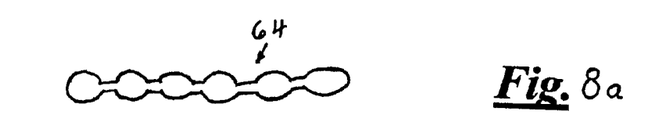
FIG. 8a is a cross-sectional view of moveable elements interconnected.
Figure 8B:
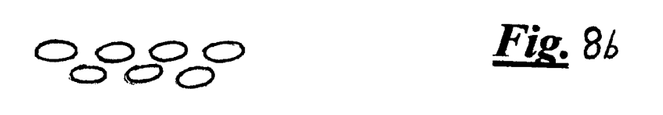
FIG. 8b is a cross-sectional view of two layers of moveable elements.
Figure 9:
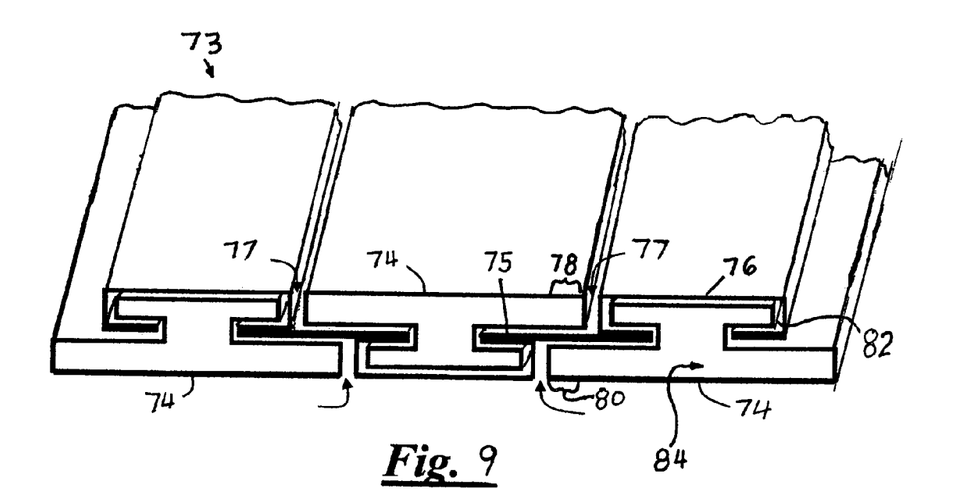
FIG. 9 shows an alternate embodiment of a shield construction having overlapping moveable elements.
Figure 10:
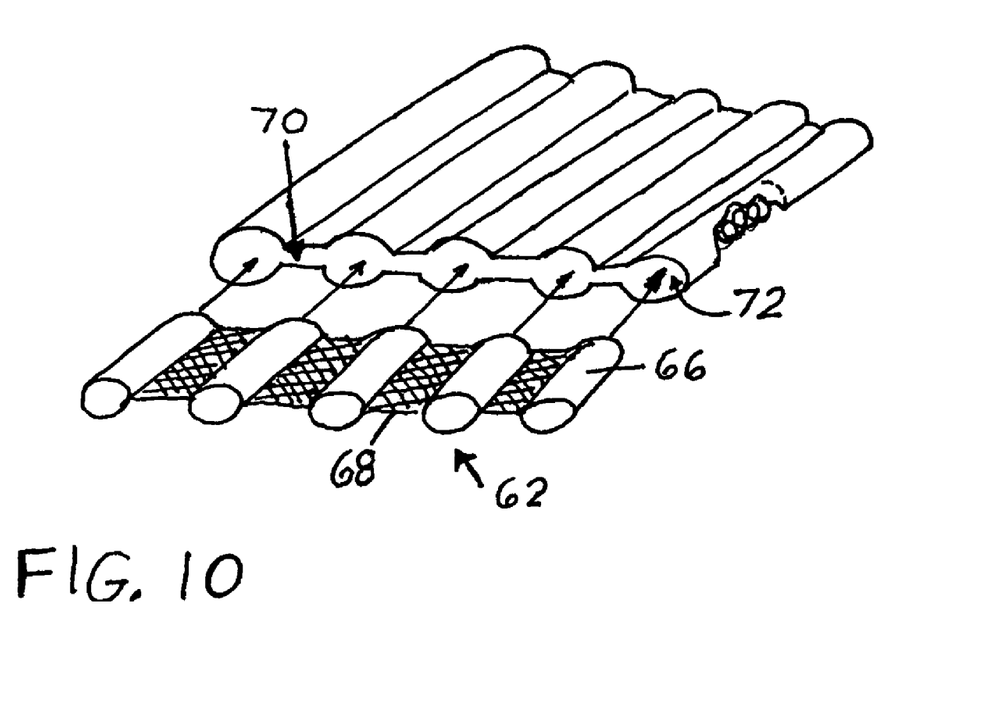
FIG. 10 shows an embodiment with moveable elements flexibly interconnected.

Alternative configurations for attaching moveable elements, such as those shown in FIGS. 8a, 8b and 9 are included in the present invention. FIG. 10 illustrates an embodiment using a moveable element 62, similar to moveable element 64 of FIG. 8a. The moveable element 62 has cylindrical rod shaped portions 66. Rib portions 68 between portions 66 block laser radiation that otherwise could pass between elements 66. The ribs 68 are relatively thin and flexible, for example constructed of a flexible mesh material, capable of movement/flexing in all directions. The spaces 70 between cylindrical bores 72, are dimensioned relative to the thickness of mesh material 68 so as to provide free movement of the ribs. FIG. 9 illustrates another alternate embodiment of a shield 73. The configuration of moveable elements 74 in FIG. 9, with a wall portion 76 provides for a complete blocking of laser radiation. As shown, a portion 78 of one element 74, overlaps a portion 80 of an adjacent moveable element 74, providing a complete blockage. Portions 75 of the wall portion 76 act in a manner similar to linkage portions 43 of FIG. 2, connecting together cavities 82. Retaining the moveable elements 74 is accomplished in a similar manner to the elements 48 of FIGS. 2-4 as described above. For example, cavity 82 of the wall portion 76 serves a similar purpose as cavity 44 of FIG. 2. For ease of illustration to show the contour of the wall portion 76, the moveable elements 74 in FIG. 9 are not shown protruding from the cavities 82, but they would normally protrude from the cavities 82 when shield 73 is placed against an uneven surface. The shield 73 also has apparatus (not shown) for flexibility and resiliently attaching the moveable elements 74 to the wall portion 76. Also, a flexible element (not shown) similar to flexible element 50 of FIG. 2 can be attached to the ends 84 of the moveable elements 74. The construction of such resilient flexible elements is similar to that disclosed for the embodiment of FIG. 2, and will be understood by those skilled in the art upon reading the present disclosure.

The flexible elements 50 of FIG. 2, and a similar element attached to the end of element 74 assist in providing a superior contact between the moveable elements 48, 74 and a work surface such as 58 and 28 across the entire width of the moveable elements, as well as provide assistance in avoiding damage to the work surface. The flexible elements may be made of any material having any shape and surface texture suitable to provide the flexibility, softness, surface conformity and laser radiation resistance, among other properties desired. Example materials include rubber, plastic, foam, etc. In any application wherein such properties are not necessary, the flexible elements may be omitted completely.

In one embodiment of the present invention, columns such as 40 (FIG. 2) are typically attached to one another such that the ends are even and each column is only attached to one or two other columns, as depicted in FIG. 2. Generally, each column 40 contacts two other columns except for the columns on either end of the shield/wall that only contact one other column. As described in reference to FIG. 1(a), columns 40 at each end of the shield wall 39 may be connected together to form a shroud or tube shaped enclosure. In this configuration, each column 40 is connected to two other columns. This is an alternative to the overlapping wall portion 32 shown in FIG. 1(a) to achieve a total surround of an object.

The connection between columns 40 may be made by any means suitable to allow each column to pivot transverse (the x-y plane of FIG. 1(a)) to the longitudinal axis (z axis of FIG. 1(a)) of the column a determinable amount, generally less than about 180 degrees, but may vary. Such attachments may be made by items such as hinges, or a flexible material, such as rubber or laser resistant fabric, attached between the columns, etc. If flexibility is not wanted or required for a given application of a shield, columns 40 may be fixedly attached together by welding, or by integration of the columns during manufacturing, to produce a non-flexible shield.

Referring again to FIGS. 2-5, cavity 44 houses biasing element 46 and a portion of moveable element 48. Biasing element 46 may be attached to the interior of cavity 44 using glues, adhesives, structural features, fasteners, or screws among others, or may be retained in the cavity in a useable position by an opposing end 86 (FIG. 2) of cavity 44, on one end, providing a surface/end 86 upon which resilient biasing element 46 can be compressed; and as explained above, moveable element 48 is retained an appropriate amount as shown in the cavity by tabs 54 and 56.

As depicted in FIGS. 2-5, moveable element 48 is inserted into cavity 44, contacting biasing element 46 along the moveable element's first end 88 and allowing its second end 90 to extend from the cavity 44. Moveable element 48 may be attached to biasing element 46 with glues, adhesives, structural features or fasteners, among others, or may merely contact the biasing element without attaching thereto. The attachment of moveable element 48 to biasing element 46 may be utilized to retain the moveable element within cavity 44, and therefore avoiding the need for tabs 54, 56. Moveable element 48 can also be retained within cavity 44 by tabs 54 interacting with tabs 56 in addition to the moveable element being attached to the biasing element 46, or as explained above, instead of attachment to biasing element 46.

Referring to FIGS. 4 and 5, tabs 54 and tabs 56 retain moveable element 48 within cavity 44 by locating tabs 56 further within the cavity than tabs 54. Tabs 56 contact tabs 54 when moveable element 48 is urged to move out of cavity 44. Tabs 54 physically obstruct the outward movement of tabs 56, thereby obstructing the movement of moveable element 48 out of cavity 44. Further, the location of tabs 54 and tabs 56 are designed to limit the amount that moveable element 48 can exit from the cavity 44 of the column.

Flexible elements 50 may be attached to the second ends 90 of moveable elements 48 as depicted best in FIGS. 4 and 5. Such attachment can be by glues, adhesives, fasteners, etc.

The embodiment of the present invention shown in FIGS. 2-5 utilizes columns 40, biasing elements 46, cavity 44, moveable elements 48 and flexible elements 50 to create a barrier to laser radiation by providing a curtain-like structure that can be bent or flexed along a plurality of longitudinal axes such as axis 92 of FIG. 2, into any shape, much like a curtain hanging in a theater. This flexibility is illustrated generally in reference to FIG. 1(a). Further, a first edge 94 (FIG. 2) of shield 38 can be pressed against any surface 58, whether it be smooth, continuous, jagged, angled, rough or otherwise, and the edge 94 can conform to the given surface topography, as depicted in FIGS. 2 and 3. To conform the edge 94 to a surface 58, moveable elements 48 are pressed against surface 58.

Each individual moveable element contacts the surface 58 and travels into its respective column 40, thereby compressing its respective biasing element 46 and pressing its respective flexible element 50 against the surface. Biasing elements 46 compress to allow moveable elements 48 to move and conform to a surface 58 as well as provide a bias to the moveable elements for exiting cavities 44 and pressing against work surface 58. Flexible elements 50 provide further conformity to a surface such as 58 by deforming around surface irregularities too small for moveable elements 48 to conform to. Thereby, a barrier to laser radiation is created between work surface 58 and shield 38, as depicted in FIG. 2.

Shield 38 may be placed around or along an area in which laser processing is to take place in order to protect people and objects from laser radiation that is directed away from the intended work piece. Placement of the shield 38 or other embodiment of the present invention, can be in a vertical orientation with moveable elements such as 48 at the bottom as described above or, at any other desirable angle wherein the moveable elements are pressed against a surface such as surface 58. The surface may be, for example, a wall, the side of a vehicle, a surface of a piece of machinery or even against a ceiling. A shield of the present invention can be designed to provide a barrier of any desirable length, height, flexibility and opacity to laser radiation, among other qualities.

For example, in one embodiment, a shield of the present invention, such as shield 38, may be designed as a curtain six feet wide and six feet tall with fifteen inches of travel provided in moveable elements to be used to protect laser welding operators while performing laser welding repairs on a military tank (not shown). In such an embodiment the welders set the wall up in a generally straight line along a surface of the tank near the welding site, with moveable elements coming into contact with the tank. Moveable elements, when pressed against the tank would depress into columns 40 where necessary, allowing the wall to adjust to work surface contours of the tank, thereby providing a barrier/shield to laser radiation through which laser radiation can pass.

In another embodiment of the present invention, a shield in the form of a curtain is placed in a circle around laser welding equipment in order to surround the laser welding operation on all sides instead of just one side. This is illustrated in FIG. 1(a), wherein the structure is like a curtain, and can fully surround an object, either having ends of the curtain attached to fully surround the object, or having an overlap, as indicated by dashed lines 32. Further, if necessary, an additional section, illustrated by lines 34 in FIG. 1(a), can be included as, for example a top of the shield 10 shown in FIG. 1(a), or it can be integrated with the wall portion, such as wall portion 16 of FIG. 1(a), to provide a barrier to laser radiation passing over or past the top of the shield. In the instance where the shield is placed completely around a work surface, the additional section provides a complete enclosure for the laser processing operation.

In another application of the present invention, a shield 38 is used in association with a portable laser processing unit (not shown). In such an application, for example, the shield can be designed with smaller dimensions, such as eight inches in width and six inches in length along with two inches of travel for moveable elements 48. Further, shield 38 of such an embodiment can be bent along its longitudinal axes, and the ends of the wall portion can be attached together to form a six inch long hollow column or tube (not shown). The tube is then mated to the laser emitting device of a portable laser system to form a shroud around the laser beam. To use the laser with this shroud attached the user, or the laser manipulation system, presses moveable elements 48 along an edge of the shroud against a work surface 58. By this technique the laser radiation is entirely surrounded by the shroud and the safety of people and objects surrounding the laser operation is increased.

Figure 6:
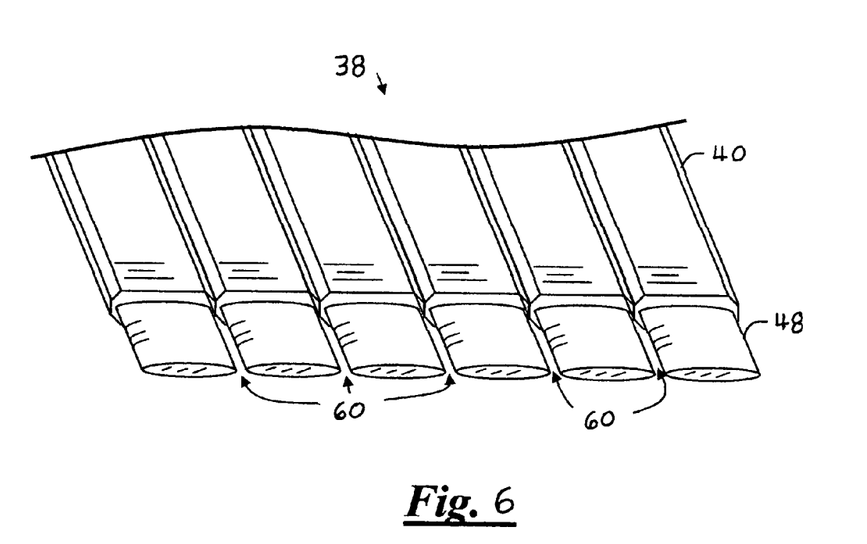
FIG. 6 is a perspective view of the shield of FIG. 2.
Figure 7:
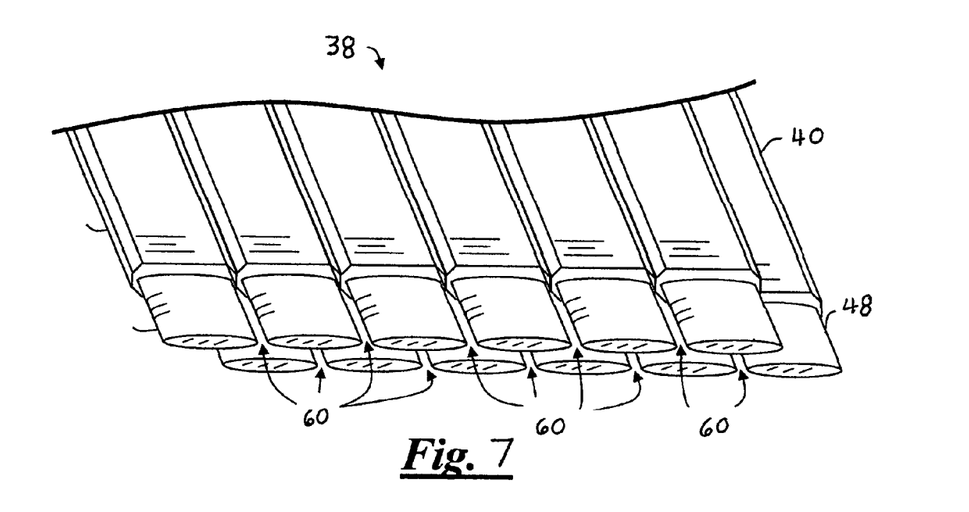
FIG. 7 is a perspective view depicting a shield having two layers of columns, moveable elements and other associated elements according to another embodiment of the present invention.

Referring to FIGS. 6, 7 and 8 in addition to FIGS. 2-5, another embodiment of the present invention having one or more layers of moveable elements is disclosed. Where only one layer is used there may be gaps between moveable elements, such as elements 48 of FIG. 2, through which laser radiation passes. FIGS. 2 and 6 illustrate gaps 60. In such a case the use of a second or more layers of moveable elements 48 slightly offset from the previous layer assists in creating a complete barrier, such as that depicted in FIGS. 7 and 8*b*. Such an embodiment may require additional layers of columns 40, or the columns can be modified to house additional layers of moveable elements 48.

In another embodiment of the present invention a moveable element such as element 48 is connected to those moveable elements adjacent to it with flexible laser resistant fabrics, rubbers or other materials. This would close any gap between the elements and stop laser radiation from passing between them. This is illustrated in FIG. 10 as described above.

The present invention can be designed and utilized for any type of laser processing including but not limited to cutting, welding, marking, scribing, trimming, annealing, milling, etching, drilling and stripping as well as operations such as barcode reading and distance measuring. The present invention can also be used with most any form of laser system including portable, hand-held and stationary systems as well as most any laser steering device such as galvo scanners, galvanometers, robotic arms with mirrors and/or optical fibers, single or multiple mirror systems including those utilizing piezoelectric elements, and gantry style systems, among others.

While this invention has been shown and described with respect to specific embodiments thereof, those skilled in the art will understand that changes in form and detail thereof may be made, and these are to included in the scope of the present invention.

The invention claimed is:

1. A shield for blocking laser radiation comprising:
   a) a wall portion configured as a flexible curtain including a plurality of columns and flexible joining apparatus for interconnecting said columns; and
   b) a resilient edge portion attached to said wall portion for conforming to a work surface, said edge portion including a plurality of resilient members attached to said plurality of columns;
   wherein each said column includes a cavity, each said resilient member includes a moveable element attached at a first end to a resilient bias element, each bias element and a portion of each said moveable member resides in said cavity, and said wall portion and said edge portion include materials for blocking a laser beam.

2. An apparatus as recited in claim 1 wherein each said resilient member further includes a flexible element attached to a second end of each moveable element for conforming to variations in said surface.

3. A shield for blocking laser radiation comprising:
   a) a wall portion configured as a flexible curtain including a plurality of columns and flexible joining apparatus for interconnecting said columns; and
   b) a resilient edge portion attached to said wall portion for conforming to a work surface;
   wherein each column has a cavity for guiding a moveable element in said cavity, each cavity has an opening to the cavity of an adjacent column, said opening providing clearance for a flexible material interconnecting said moveable elements, said flexible material for blocking a laser beam from passing between said moveable elements, and said wall portion and said edge portion include materials for blocking a laser beam.

4. An apparatus as recited in claim 1 wherein said edge portion includes at least two offset rows of moveable elements for blocking a laser beam.

5. An apparatus as recited in claim 3 wherein said edge portion includes at least two offset rows of moveable elements for blocking a laser beam.

\* \* \* \* \*